Feb. 20, 1968 R. ZULEEG 3,370,184

COMBINATION OF THIN-FILMED ELECTRICAL DEVICES

Original Filed Dec. 24, 1963 3 Sheets-Sheet 1

INVENTOR.
RAINER ZULEEG,
BY

ATTORNEY.

COMBINATION OF THIN-FILMED ELECTRICAL DEVICES

Original Filed Dec. 24, 1963 3 Sheets-Sheet 2

INVENTOR
RAINER ZULEEG,
BY
W. Hume McAllister Jr.
ATTORNEY.

COMBINATION OF THIN-FILMED ELECTRICAL DEVICES

Original Filed Dec. 24, 1963 3 Sheets-Sheet 3

INVENTOR.
RAINER ZULEEG,
BY
W Wallace Allister Jr.
ATTORNEY.

3,370,184

COMBINATION OF THIN-FILMED ELECTRICAL DEVICES

Rainer Zuleeg, Huntington Beach, Calif., assignor to Hughes Aircraft Company, Culver City, Calif., a corporation of Delaware Continuation of application Ser. No. 333,127, Dec. 24, 1963. This application Dec. 14, 1966, Ser. No. 633,638
7 Claims. (Cl. 307—303)

This is a continuation of S.N. 333,127 filed December 24, 1963, by the same inventor and assigned to the instant assignee which has become abandoned.

This invention relates to novel high frequency solid-state electronic devices of both active and passive types and to methods for fabricating such devices. More particularly, the invention relates to solid-state active devices such as rectifiers and amplifiers and to solid-state passive devices such as transmission lines and the like. As used herein the term "active device" means any solid-state electronic device which can alter one or more characteristics of an electrical signal applied thereto in a controllable and reproducible fashion while the term "passive device" means any solid-state electronic device or apparatus which does not controllably alter the characteristics of an electrical signal applied thereto or transmitted thereby.

The fabrication of such devices, both active and passive, by means of and in the form of thin-films is known. A thin-film transistor is described in my co-pending application, S.N. 258,081 filed February 12, 1963 and assigned to the instant assignee, as well as in an article by P. K. Weimer entitled "The TFT—A New Thin-Film Transistor" published in the June 1962 Proceedings of the I.R.E. commencing on page 1462. Because of both the techniques for forming such devices and because of their extremely small dimensions, the fabrication of complete solid-state circuits, including passive as well as active functions, has become of increasing importance and has given rise to a whole new art called variously, solid circuitry, micro-circuitry, integrated circuitry, or microelectronics. Such circuitry is possible because of the ability to form by vapor-deposition, masking and solid-state diffusion techniques thin films capable of controllably providing such functions as rectification, amplification, resistance, capacitance, and inductance, in a single integrated structure. Thus amplification can be provided by vapor-depositing a thin film metallic electrode, which may be called a "source," upon a substrate and then depositing a thin-film of a semi-insulator material upon the "source" electrode film. A "drain" or collector electrode is then formed by depositing a thin metallic film on the semi-insulator film. Likewise by masking and vapor-deposition techniques an additional metallic "gate" or control electrode in the form of a grid, for example, may be disposed in the semi-insulator film between the source and drain electrode films. Thus the flow of majority charge carriers from the source to the drain electrodes through the semi-insulator may be controlled by the field therein established by a signal on the gate electrode. Such devices are closely analogous to vacuum tube devices except that in these thin-film devices the charge carriers flow from cathode to anode in a solid medium generally called a semi-insulator.

It will be appreciated that the disposition of active and passive components into a single integrated circuit requires some means for securing the necessary electrical inter-connections. While in many applications such inter-connections may be achieved by merely utilizing a conductive metal strip or film as in printed circuit applications, it will be appreciated that high-frequency applications, especially above 50 megacycles, require low impedance, low coupling connections and transmission lines, else signal loss and degradation become unacceptably severe. In more conventional circuitry of large size such connections and transmission lines may be provided by co-axial conductors or the like. However such conventional techniques are almost impossible for use in thin-film circuits because of the extremely small dimensions thereof. The present invention relates therefore, in one aspect thereof, to a novel thin-film high frequency coupling network or transmission line.

The kind of high frequency transmission line to which the present invention appertains is a flat strip microwave transmission line identified by the registered trademark "Tri-Plate" by the owner and manufacturer thereof, Sanders Associates, Inc. of Nashua, New Hampshire. This type of transmission line is fully described in a publication by Sanders Associates, Inc. entitled "Handbook of Tri-Plate Microwave Components" (1956). The transmission line consists essentially of a flat center conductor embedded in a dielectric material which is sandwiched between flat ground-plates or planes. The dielectric materials suggested and/or used are Teflon (polytetrafluoroethylene) with glass or quartz-filled laminates or mixtures; polystyrene; or alloys of dimethyl silicone and styrene copolymer resin. The ground plates are generally provided by copper foil adhesively bonded to the plastic dielectric under pressure. The aforementioned handbook notes that bonds obtained by spraying or plating the metal onto the dielectric are normally weak.

It will thus be appreciated that while the foregoing flat strip microwave transmission line is an exceptionally useful device, the applicability thereof to microelectronic integrated circuitry leaves something to be desired. Thus, with the aforementioned materials the formation of a transmission line by vapor-deposition techniques does not appear to be particularly feasible and would tend to defeat the attainment of complete integration. Furthermore, since the degree of purity and freedom from contamination required for semiconductor devices is so severe, the use of such materials as copper and plastics for connections in integrated circuits including such devices would pose serious problems in the fabrication and operation thereof.

It is, therefore, an object of the present invention to provide improved thin-film electrical apparatus.

Another object of the invention is to provide an improved high frequency transmission line.

Another object of the invention is to provide improved thin-film electrical apparatus for use in microelectronic integrated circuitry.

Yet another object of the invention is to provide an improved high frequency transmission line for microelectronic integrated circuitry which can be fabricated as an integral part of such circuitry.

These and other objects and advantages of the invention are attained by providing a center strip conductor of a semi-insulator material and electrically isolating the center strip from the surrounding material by means of either a rectifying barrier or by an electrically insulating material. To complete the transmission line, the surrounding semi-insulator material is sandwiched between a pair of conductive ground plates or planes. The center strip may itself comprise semi-insulator material of a first conductivity type embedded in semi-insulator material of a different conductivity type. As a typical example, a center conductor or core of N-type silicon may be embedded in a body of a P-type silicon so as to be co-extensive therewith. Alternatively, the center strip may be formed of a conductive material which is electrically insulated from the surrounding semi-insulator material. The electrically conductive ground plates or planes may be provided by degenerately-doped semi-insulator material or by vapor-deposited layers of aluminum, for example, on opposed surfaces of the semi-insulator body. In a typical embodiment a layer of metal may be vapor-deposited on a silicon substrate and alloyed therewith to form as the first ground-plane a degeneratively-doped silicon regrowth region. A thin-film of P-type silicon may then be epitaxially deposited over and along the degeneratively-doped regrowth region and then oxidized to form a surface coating of $SiO_2$, for example. By photo-masking and etch resist techniques a center strip may be formed through the oxide mask to thereby expose a strip of the P-type silicon therebeneath which extends along the length of the silicon film. Surface and near-surface portions of the exposed silicon strip may be then converted by a diffusion operation to N-type conductivity, after which the oxide may be removed and a further thin-film of P-type silicon epitaxially deposited upon both the exposed P-type silicon surface and the N-type silicon strip. In this manner a thin-film of P-type silicon having a center core of N-type silicon embedded therein and extending along the length thereof may be fabricated. The upper and second ground-plane may then be formed by vapor-depositing a layer of aluminum, for example, over the surface of the second epitaxially deposited P-type silicon.

The invention will be described in greater detail by reference to the drawings in which:

FIGURE 1 is a perspective view partly in section of a thin-film transmission line according to the invention;

FIGURES 2(*a*) through 2(*d*) are perspective views partly in section of the thin-film transmission line shown in FIGURE 1 and illustrating various stages in the fabrication thereof;

Figure 5A:
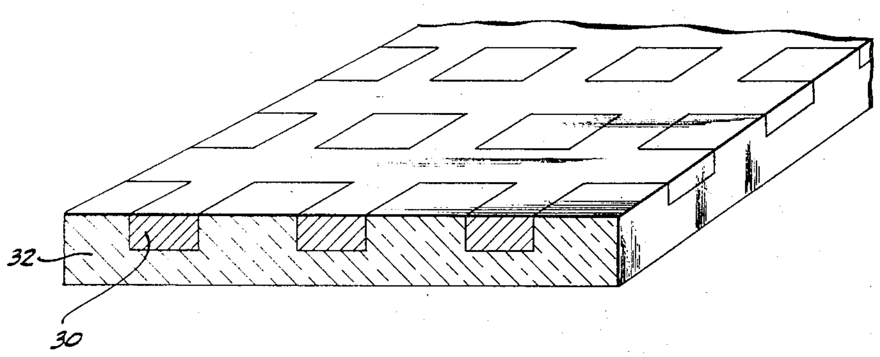
Figure 5B:
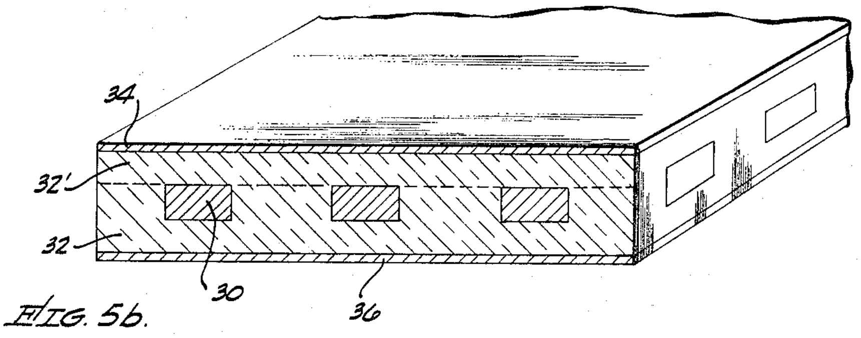
Figure 6:
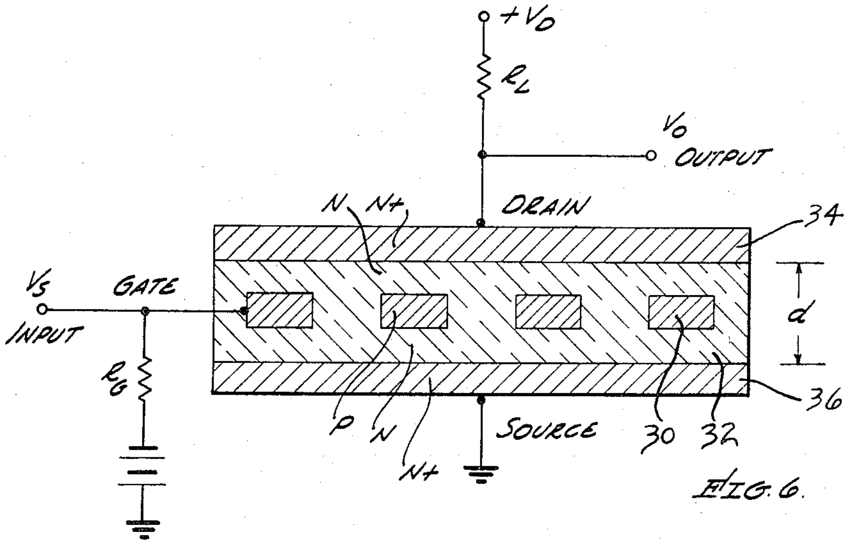
Figure 7:
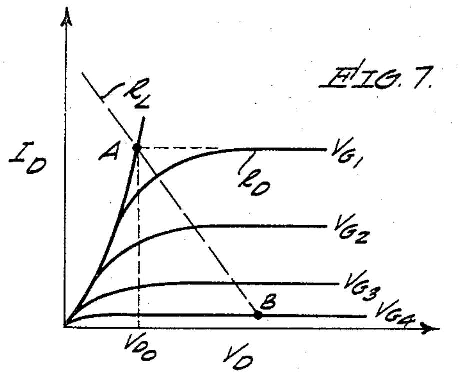

FIGURES 5(*a*) and 5(*b*) are perspective views partly in section of a thin-film active device according to the invention;

FIGURE 6 is an elevational view partly schematic and partly in section of an active thin-film device according to the present invention; and FIGURE 7 is a graph showing pertinent electrical characteristics of the active device shown in FIGURE 6.

Figure 1:
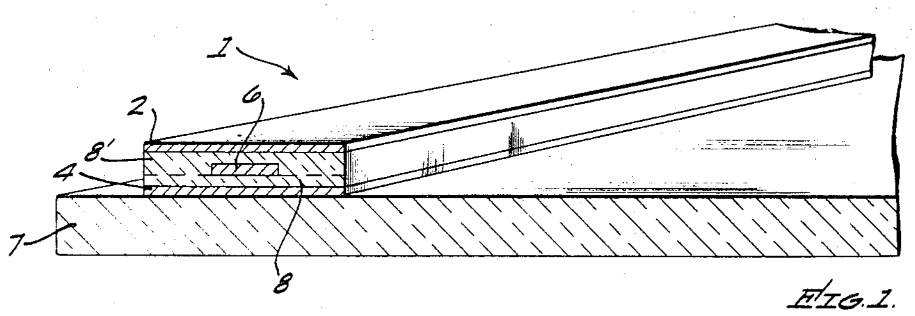
Figure 2A:
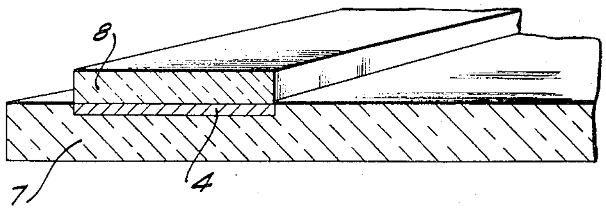
Figure 2B:
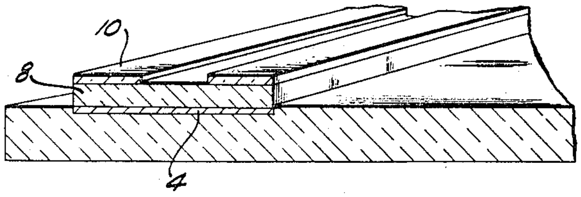
Figure 2C:
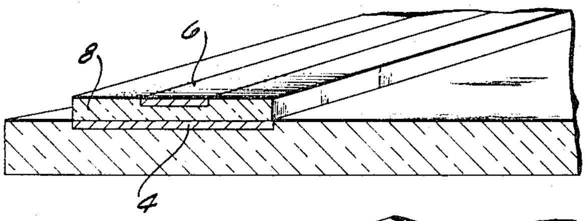
Figure 2D:
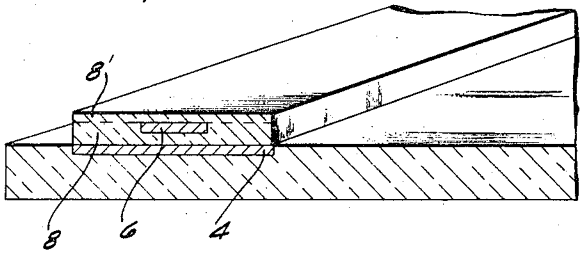

Referring now to FIGURE 1 a high frequency thin-film transmission line 1 is shown comprising a pair of outer ground planes or plates 2 and 4, a center conductor member 6, and a strip of semi-insulator material 8 in which the center conductor 6 is embedded. The ground plates 2 and 4 may be of any good electrically conductive material such as aluminum or gold, for example. For reasons which will be demonstrated hereinafter, where metals are used for the ground plates 2 and 4, it is desirable to utilize metals which may be conveniently formed and applied by evaporation and deposition techniques, although other methods may be used for this purpose. Thus, it is also possible to form and apply the ground plates by spraying or brushing solutions or the like in which the metal may be dispersed. It is also feasible to apply the metal to the semi-insulator body 8 in the form of thin foils or films and to subsequently bond or fuse, as by heating the foil to the semi-insulator body.

In connection with transmission lines according to the present invention, the term "semi-insulator" refers to and means any material which at room temperature has a low intrinsic majority carrier concentration so that at room temperature the material exhibits low electrical conductivity. In general, any material which exhibits an energy gap of at least about 1.0 ev. is satisfactory for the semi-insulator element in the devices of the present invention. Suitable materials are silicon and compounds of the elements from the Third with elements from the Fifth Columns of the Periodic Table of the Elements such as: aluminum phosphide, aluminum arsenide, aluminum antimonide, gallium phosphide, gallium arsenide, indium phosphide; also satisfactory are compounds of the elements from the Second Column with elements from the Sixth Column of the Periodic Table of the Elements such as: zinc sulfide, zinc selenide, zinc telluride, cadmium sulfide, and cadmium selenide, cadmium telluride, and mercury sulfide. Silicon carbide is also a suitable semi-insulator material for the purposes of the present invention. While any of the aforementioned materials may be used to advantage in the practice of the invention, description herein will be confined primarily to the use of cadmium sulfide or silicon as exemplary materials.

According to the embodiment of the invention shown in FIGURE 1 the semi-insulator body 8 may be of cadmium sulfide, for example, and the center conductor member 6 may be of the same material as the ground planes 2 and 4 (i.e., gold). When an uninsulated metallic center conductor is employed, it should not be of a metal which injects charge carriers into the semi-insulator material. Thus, for example, in the present case where the semi-insulator material is cadmium sulfide, the center conductor may be gold since this metal, being of a higher work function than is cadmium sulfide, will not inject charge carriers thereinto, there being, in effect, a barrier between the center conductor 6 and the semi-insulator 8.

The device may be formed by vapor depositing gold through a suitable mask on to a non-conductive substrate 7 which may be of glass, for example, so as to form a narrow strip 4 of gold on the surface of the substrate 7 to serve as the first ground plane. Thereafter, again by suitable masking, a layer 8 of cadmium sulfide may be deposited onto the gold layer or ground plane 4 to a predetermined thickness. Again by further masking of the cadmium sulfide film 8 thus formed, a narrow strip of the layer 8 may be left exposed to permit the vapor deposition therein and thereon of gold to form a center conductor 6. Thereafter the vapor deposition of cadmium sulfide is again performed so as to deposit an additional layer 8' of cadmium sulfide over the exposed surface of the first cadmium sulfide layer 8 and over the center conductor 6. By this operation the center conductor 6 is thus embedded in a strip of semi-insulator material formed by the cadmium sulfide layers 8 and 8', which now form an integral layer. The final step is to vapor-deposit the second ground plane member 2 which may be accompanied by vapor depositing gold through a suitable mask onto the top surface of the cadmium sulfide layer 8'.

In FIGURES 2(*a*) through 2(*d*) a similar type of thin film transmission line is shown in which the semi-insulator material is of silicon. Because of the great difficulty in vapor-depositing silicon upon surfaces other than silicon itself, the fabrication of a thin-film transmission line utilizing silicon follows a somewhat different procedure from the fabrication of the device shown in FIGURE 1 wherein cadmium sulfide was utilized as the semi-insulator material. Thus, one cannot without great difficulty vapor-deposit silicon semi-insulator material upon the first metallic ground plane 4 as was done with cadmium sulfide in fabricating the device of FIGURE 1. Since, however, silicon may be conveniently deposited upon silicon, it is feasible to form at least the lower or first ground plane 4 of silicon which has been heavily-doped so as to be an effective electrical conductor. The silicon semi-insulator material may then be deposited upon this degeneratively-doped and hence conductive silicon. Such a silicon substrate and ground plane may be provided in several ways. A heavily-doped silicon substrate may be utilized and after forming the transmission line thereon according to the invention, the surface of the substrate may be oxidized so as to provide an electrically insulating support for other electrical components. Alternatively, the silicon substrate may be either lightly-doped or intrinsic so as to present an effective electrically insulating surface with the first ground plane formed therein by heavily-doping predetermined surface and near-surface portions as by alloying or diffusion techniques. By such heavy doping these surface and near-surface portions can be converted to degenerative semi-insulating material which means that these portions have such a concentration of impurity therein as to cause them to lose their semi-insulator characteristics and to behave as more conventional electrical conductors. If the semi-insulator material 8 be of P-type conductivity, the ground plane 4 may be formed by diffusing into the surface and near-surface portions of the silicon substrate a P-type impurity such as aluminum. If the semi-insulator material be of N-type conductivity the ground plane may be formed by likewise diffusing an N-type impurity such as arsenic into the silicon substrate. The kind of degenerate doping employed is primarily determined by the conductivity type of the semi-insulator forming the transmission line and not by the conductivity type of the substrate, although it may be desirable to maintain a common conductivity type for the semi-insulator, the first ground plane, and the substrate.

For convenience and solely for purposes of illustration, the semi-insulator body 8 in this embodiment may be referred to as being of N-type conductivity due to an excess of majority charge carriers (i.e., electrons) therein and the center conductor 6 may be referred to as being of P-type conductivity due to a deficiency of majority charge carriers (i.e., electrons) therein. It will be understood that such conductivity conditions are usually established by the incorporation of certain impurity elements into the bulk semi-insulator material. Thus silicon, for example, may have any one of such impurity elements as arsenic, antimony, or phosphorus incorporated therein to establish N-type conductivity since these elements contribute an excess of electrons to the silicon for current conduction. P-type silicon may have any one of such impurity elements as aluminum, boron or gallium incorporated therein to establish P-type conductivity since these elements lack an excess of electrons for current conduction. The process of incorporating such impurity elements into the crystal lattice structure of semiconductor materials is well known and is commonly referred to as "doping" and may be achieved by diffusion or alloying.

According to the aspect of the invention shown in FIGURES 2(*a*) through 2(*d*), the center conductor member 6 may be of semi-insulator material and, as has been mentioned previously, of the same material as the semi-insulator body 8 although of different conducivity type. Thus, if as described the semi-insulator body 8 is of P-type conductivity, the center conductor member 6 may be of N-type conductivity. The center conductor member 6 is also heavily doped so as to exhibit high conductivity (low resistivity). That is, the center conductor member 6 is of semi-insulator material which is so heavily doped as to be degenerate which means that its conductivity is akin to that of metals such as copper and aluminum.

Still referring to FIGURES 2(*a*) through 2(*d*), the fabrication of a high frequency transmission line according to the invention may be achieved by forming a first ground-plane or conductor 4 by diffusing a donor-conductivity type-determining through a suitable mask upon a substrate 7 of lightly-doped N-type silicon, for example. The mask may be formed by oxidizing the surface of the silicon substrate and then removing a strip of the oxide corresponding to the dimensions and pattern of the transmission line to be formed as by photo-resist and etching techniques. A very heavy diffusion is achieved so as to form a degenerative strip of N-type silicon material. It is also possible that this ground-plane 4 might be in the form of a strip of thin foil of antimony-doped gold, for example, which is alloyed to the supporting substrate so as to form a heavily-doped N-type silicon regrowth region.

A layer 8 of N-type silicon may then be expitaxially deposited through a mask upon the ground-plane 4. In this process the silicon may be formed by the epitaxial process and caused to deposit upon the ground-plane by the simultaneous reduction in hydrogen of phosphorous trichloride and silicon tetrachloride at a temperature of from 1200–1300° C. This process is well known and fully described by H. C. Theuerer in the Journal of the Electrochemical Society (1961—vol. 108 at page 649) and by A. Mark in the same journal (1961—vol. 108 at page 880).

After the silicon layer 8, which may be about 1–10$\mu$ thick, for example, is formed, a non-conductive mask or covering 10 is formed on the upper or exposed major surface thereof as by oxidizing this surface to form a layer of silicon oxide ($SiO_2$) thereon. After a suitable oxide mask, about 1–2$\mu$ thick, for example, has been formed, a center strip of oxide corresponding to the desired width of the center-strip conductor to be formed, is removed by photo-resist and etching techniques which are well known to the art. Thus the oxide layer 10 may be coated with a photo-resist material portions of which are exposed, as by a mask, to a light pattern corresponding to the strip to be removed. The photo-resist is then developed whereby the unexposed portions are formed into an etch-resistant coating while the exposed center-strip is removed by chemical dissolution, as is well known in this process, to expose a center-strip of oxide. The exposed oxide is then removed as by etching the same with hydrofluoric acid to expose a center-strip of the original N-type silicon. Thereafter the remaining etch-resistant photo-resist coating may be removed altogether.

The assembly is then exposed to an atmosphere containing the vapors of a P-type conductivity-type-determining impurity, such as boron, for example, which impurity, by the process of diffusion into the exposed N-type silicon surface through the center-strip opening in the oxide mask 10, converts a strip 6 of surface and near-surface portions of the exposed silicon to P-type conductivity. These oxide masking diffusion techniques are well known in the art and reference is made to U.S. Patent Nos. 2,802,760 to Derick and Frosch and 3,025,589 to Hoerni for a complete, detailed description thereof.

After the diffusion step has been completed the remaining oxide film 10 is removed altogether as by etching the same with hydrofluoric acid to provide the assembly shown in FIGURE 2(*c*). The next step is to form a further layer 8′ of N-type silicon, by the epitaxial deposition process described previously, over the original N-type silicon layer 8 and the P-type center-strip 6, just formed as described. By this step the device shown in FIGURE 2(*d*) is provided comprising a center-strip 6 of P-type silicon disposed or embedded in a thin layer of N-type silicon. To complete the fabrication of the high frequency transmission line the second ground-plane 2 may be formed by converting the surface and near-surface portions of the epitaxial N-type silicon layer 8′ into heavily or degeneratively-doped silicon as by diffusing or alloying an N-type impurity therein such as arsenic as described previously. It will be understood that while the epitaxially deposited silicon layers 8 and 8′ are referred to herein as separate "layers," they are in fact indistinguishable in the final product since the last epitaxially deposited silicon layer 8′ coalesces with and forms an unbroken extension of the original silicon layer 8.

The characteristic impedance ($Z_0$) of such a transmission line as set forth on page 8 of the aforementioned handbook is given by the expression:

$$Z_0=\frac{94.15}{\epsilon_r\left(\frac{w/b}{1-t/b}+\frac{C'_f}{0.885\epsilon_r}\right)}\text{ ohms}$$

when the ratio of the width of the center conductor ($w$) to the spacing ($b$) between the ground planes is equal to or more than 0.35. In this expression $\epsilon$ is the relative dielectric constant, $t$ is the thickness of the center conductor, and $C'_f$ is the fringing capacitance. By the present invention a characteristic impedance of 50 ohms may be obtained in a transmission line many times physically smaller than heretofore possible.

Figure 3:
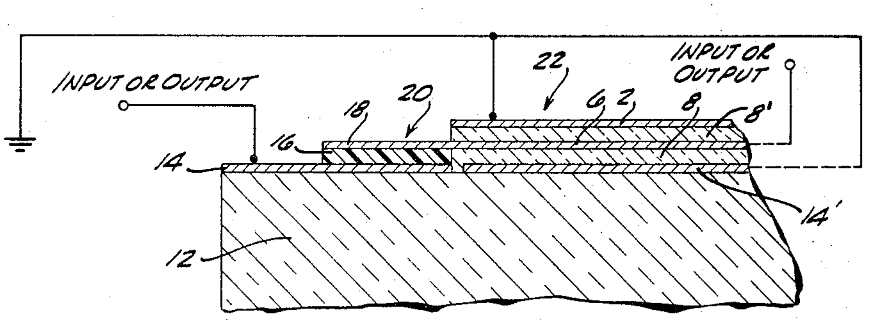
FIGURE 3 is a partially schematic and elevational view in section showing the transmission line of FIGURE 1 in combination with a micro-electronic integral circuit.

In FIGURE 3 the application of the high frequency transmission line 22 according to the invention for connecting a thin-film diode device 20 in a micro-circuit is illustrated. It will be understood that the micro-circuit is disposed on a non-conductive substrate 12 which may be of glass, for example. For a more complete description of the thin film diode device 20 reference is made to my co-pending application entitled "Thin Film Diode," S. N. 254,209, filed January 28, 1963, now Patent No. 3,304,471 likewise assigned to the present assignee. Briefly this device comprises a thin film 16 of semi-insulator material such as cadmium sulfide disposed between a pair of metal electrodes one of which has a work function higher than the work function of the semi-insulator and the other of which has a work function lower than the work function of the semi-insulator. In a typical embodiment of such a device one of the electrodes may be formed of gold, for example, and the other of aluminum, for example.

Such a micro-circuit element and transmission line may be constructed according to the invention by first vapor depositing through a suitable mask two discrete metal layers 14 and 14' on the surface of the substrate 12. The metal layer 14 serves as the electrode layer of the thin-film diode device 20 while the metal layer 14' serves as the first ground plane of the thin-film transmission line 22. For this purpose of suitable metal may be aluminum, for example. Thereafter portions of the surface of the substrate may be masked so as to provide an opening therethrough corresponding to the shape and size of both the thin-film diode device 20 and the thin-film transmission line 22. Cadmium sulfide may then be vapor deposited through this opening to form a cadmium sulfide film 16 on portions of the metal layer 14 as well as a cadmium sulfide layer 8 on the metal layer 14'. The cadmium sulfide also fills in the space on the surface of the substrate 12 between the metal layers 14 and 14' to effectively isolate these layers electrically from each other. Again, by suitable masking, a layer of metal which may be gold is deposited over the cadmium sulfide layers 8 and 16 to serve as the center-strip conductor 6 of the transmission line 22 and as the second electrode 18 of the thin-film diode device 20, respectively. Since the electrode 18 of the diode device 20 and the center-strip conductor 6 are continuous and integral, the attainment of a good electrical connection therebetween is assured.

After the electrode 18 and the center-strip 6 have been formed, the active thin-film device 20 and other predetermined portions of the micro-circuit may be suitably masked so as to leave the center-strip 6 exposed to permit the deposition of a further layer 8' of cadmium sulfide thereover as described previously. The final step is the fabrication of the upper ground plane 2 which may be achieved by vapor deposition of aluminum, for example, likewise as described previously. It will be understood that the other end of the transmission line may be connected in similar fashion to other components or devices as desired.

Figure 4:
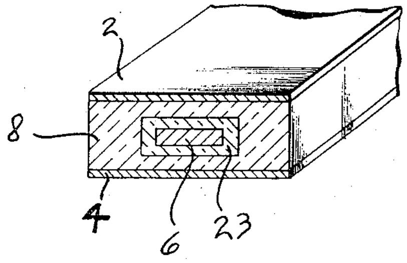
FIGURE 4 is a perspective view partly in section of another embodiment of a thin-film transmission line according to the invention.

In FIGURE 4 another arrangement of a transmission line is shown according to the present invention which achieves isolation of the center-strip conductor 6 from the semi-insulator material 8 by means other than a rectifying barrier or junction. This arrangement permits one to utilize metals for the center-strip conductor 6 which might, except for the novel arrangement shown in FIGURE 4, inject charge carriers into the semi-insulator material. According to this embodiment the center-strip conductor 6 is electrically isolated from the semi-insulator material by a coating or envelope 23 of a non-conductive material which has high electrical resistivity. A typical material may be silicon oxide, for example.

The transmission line of FIGURE 4 may be fabricated by first forming a ground-plane 4 of gold, for example, by techniques described previously. Next, a layer of cadmium sulfide may be deposited over the ground-plane 4. After suitable masking to leave exposed a center-strip portion of the cadmium sulfide, a layer 23 of silicon oxide is deposited thereon after which the center conductor 6 may be formed by vapor depositing aluminum, for example, onto the layer of silicon oxide. Thereafter the deposition of silicon oxide is continued so as to cover the sides and the top of the center-strip conductor 6. The final steps in the construction of this transmission line are the resumption of cadmium sulfide deposition over and around the silicon oxide layer 23, and then the deposition of the second ground-plane 2 as by depositing gold on the cadmium sulfide body 8. In this manner the center-strip conductor 6 is substantially electrically isolated from the semi-insulator material 8 by means of the oxide envelope 23.

Referring now to FIGURES 5(*a*) and 5(*b*) a thin-film active semiconductor device is shown which may be fabricated by the deposition and diffusion techniques described heretofore. This device comprises a grid 30 of N-type material, for example, which is formed in a body 32 of P-type silicon by the oxide masking and diffusing techniques already described. The N-type grid may be formed by diffusing arsenic through a mask into a boron doped semiconductor body 30. Thereafter the non-conductive mask material is removed as by etching with hydrofluoric acid in the case where a silicon oxide mask is employed. Next an additional P-type layer 32' is formed over the grid 30 and the exposed surface of the initial P-type silicon body 32 by epitaxially depositing P-type silicon as described.

The complete device is shown in FIGURE 5(*b*) and includes an upper metallic electrode 34 comprising a layer of aluminum and a lower metallic electrode 36 comprising also a layer of aluminum. In this device the current flowing from the electrode layer 36 to the electrode layer 34 through the P-type silicon material 32 and 32' may be controlled by impressing any desired signal on the N-type grid 30. The appropriate signal on the grid 30 will establish an electric field around the grid in the P-type portion so as to effectively suppress or close off the flow of majority charge carriers through the interstices of the grid from one electrode to the other.

The device of FIGURES 5(*a*) and 5(*b*) may also be provided in the reverse polarity; that is, the grid 30 may be composed of P-type material and the semi-insulator body of N-type material. It is also feasible to replace the metallic top and bottom layers 34 and 36 with heavily-doped or $N^+$ diffused or alloyed layers where the semi-insulator body is of N-type conductivity or with heavily-doped or $P^+$ diffused or alloyed layers where the semi-insulator body is of P-type conductivity. The designations $N^+$ and $P^+$ are intended to indicate degenerate or nearly degenerate doping.

FIGURE 6 shows a typical biasing arrangement for the $N^+$ (NPN) $N^+$ thin-film field effect triode of FIGURES 5(*a*) and 5(*b*). The input impedance of this device is very high since a reverse biased P-N junction is present and can be in the range of $10^6$–$10^8$ ohms. By the arrangement shown in FIGURE 6 an incoming A.C. signal of voltage, $V_s$, may be amplified by the thin-film device and taken out at the drain terminal 34 according to the expression $$V_{out}=V_s g_m R_L$$

where $g_m$ is the transconductance, and $R_L$ is the load resistance in the circuit. As long as $R_L$ is smaller than the drain differential resistance, $$R_D=\frac{dV_D}{dI_D}$$

considerable voltage gain is possible, thus, when $g_m$ is 5,000 μmho and $R_L$ is 10,000 ohm, the voltage gain, $V_{out}/V_s$, will equal 50. For an increasing negative voltage at the gate, $V_G$, the drain current will be reduced and the transconductance will be diminished as well. At a particular voltage of $V_G$, which is called the pinch-off voltage, $V_{GP}$, the current flowing from the source 36 to the drain 34 will be almost completely depressed and can take on negligible values. Thus the device can be used successfully as a switching element. Referring to FIGURE 7, when no gate voltage is applied the device is in its conducting state at point A which corresponds to its high current, low voltage state. By applying sufficient negative gate voltage, the device will switch to point B along the loadline $R_L$; point B corresponds to the low current, high voltage state (or off-state) of the device.

The active device will be able to perform well as a high frequency and high power amplifier. High frequency operation is achieved by reason of the close spacing of the drain to the source, so that the transit time of the majority carriers, $$t=\frac{d^2}{\mu V}$$

becomes very small and therefrom the frequency response, which is inversely proportional to $t$ becomes very high ($f\sim 1/t$). Thus, when $d=2\mu$, $\mu=100$ cm.$^2/V_{sec.}$ and $V=10V$, $t$ will equal $4\times 10^{-11}$ sec. which provides a frequency response in the microwave region. High power operation is possible because of the good heat sink which is the adjacent material around the device and will conduct the heat away from the active region.

What is claimed is:

1. Integrated electrical apparatus comprising:

(a) an electrically insulating support member;

(b) a high frequency electrical transmission line disposed on said support member and formed of a body of semi-insulator material disposed between a pair of electrical conductive members and having an inner electrical conductive member disposed within and surrounded by a barrier layer formed between said inner member and said semi-insulator material;

(c) and a solid-state active electronic device comprising a body of semi-insulator material formed integrally with said first-named body of semi-insulator material and having at least one electrode member in contact with said second-named body of semi-insulator material and formed integrally with said inner one of said electrically conductive members of said high frequency transmission line whereby said active device is electrically connected to said transmission line.

2. The apparatus according to claim 1 wherein said electrode member is formed integrally with said inner electrically conductive member of said high frequency transmission line.

3. Integrated electrical apparatus comprising:

(a) an electrically insulating support member;

(b) a high frequency electrical transmission line disposed on said support member and formed of a body of semi-insulator material disposed between a pair of electrically conductive members and having an inner electrically conductive member disposed within and surrounded by a barrier layer formed between said inner member and said semi-insulator material;

(c) and a solid-state active electronic device comprising a body of semi-insulator material disposed on said support member formed integrally with said first-named body of semi-insulator material and having at least one electrode member in contact with said second-named body of semi-insulator material formed integrally with one of said electrically conductive members of said high frequency transmission line whereby said active device is electrically connected to said transmission line.

4. The apparatus according to claim 3 wherein said electrode member is formed integrally with said inner electrically conductive member of said high frequency transmission line.

5. The apparatus according to claim 3 wherein said semi-insulator material comprising the bodies of said high frequency transmission line and said active device and said one electrode member thereof are vapor-deposited layers.

6. Integrated electrical apparatus comprising:

(a) an electrically insulating support member;

(b) a high frequency electrical transmission line disposed on said support member and formed of a body of semi-insulator material disposed between a pair of electrically conductive members and having an inner electrically conductive member disposed within and surrounded by a barrier layer formed between said inner member and said semi-insulator material;

(c) and a solid-state diode device comprising a first electrode member disposed on said support member, a body of semi-insulator material disposed on said first electrode member and formed integrally with said first-named body of semi-insulator material, and a second electrode member disposed on said second-named body of semi-insulator material and formed integrally with one of said electrically conductive members of said high frequency transmission line whereby said diode device is electrically connected to said transmission line.

7. The apparatus according to claim 6 wherein said second electrode member is formed integrally with said inner electrically conductive member of said high frequency transmission line.

References Cited

UNITED STATES PATENTS

| | | | |
|---|---|---|---|
| 3,133,207 | 5/1964 | Ayer | 307—88.5 |
| 3,155,881 | 11/1964 | St. Jean | 317—101 |
| 3,191,055 | 6/1965 | Swihart et al. | 307—88.5 |

JAMES D. KALLAM, *Primary Examiner.*